United States Patent
Sharonov et al.

(10) Patent No.: US 10,317,525 B2
(45) Date of Patent: Jun. 11, 2019

(54) ROBUST DUAL-RADAR-BEAM SYSTEMS AND METHODS FOR TRAFFIC MONITORING

(71) Applicant: HOUSTON RADAR LLC, Houston, TX (US)

(72) Inventors: Sergei Sharonov, Houston, TX (US); Brian Hill, Albuquerque, NM (US); Vipin Malik, Cypress, TX (US); Stanley J Smith, Bradenton, FL (US)

(73) Assignee: HOUSTON RADAR LLC, Houston, TX (US)

( * ) Notice: Subject to any disclaimer, the term of this patent is extended or adjusted under 35 U.S.C. 154(b) by 198 days.

(21) Appl. No.: 15/127,776

(22) PCT Filed: Mar. 19, 2015

(86) PCT No.: PCT/US2015/021605
§ 371 (c)(1),
(2) Date: Sep. 20, 2016

(87) PCT Pub. No.: WO2015/143243
PCT Pub. Date: Sep. 24, 2015

(65) Prior Publication Data
US 2017/0176590 A1    Jun. 22, 2017

Related U.S. Application Data

(60) Provisional application No. 61/968,587, filed on Mar. 21, 2014.

(51) Int. Cl.
| | | |
|---|---|---|
| G01S 13/64 | (2006.01) | |
| G01S 13/92 | (2006.01) | |
| G01S 13/87 | (2006.01) | |

(52) U.S. Cl.
CPC ............. *G01S 13/92* (2013.01); *G01S 13/64* (2013.01); *G01S 13/87* (2013.01)

(58) Field of Classification Search
CPC ........... G01S 13/87; G01S 13/64; G01S 13/92
(Continued)

(56) References Cited

U.S. PATENT DOCUMENTS

| | | | | |
|---|---|---|---|---|
| 4,626,856 A | * | 12/1986 | Pierson | ................... G01S 7/288 342/174 |
| 5,159,345 A | | 10/1992 | Young | |

(Continued)

FOREIGN PATENT DOCUMENTS

WO    2005036771 A1    4/2005

OTHER PUBLICATIONS

Extended European Search Report dated Oct. 25, 2017, in European Application No. 15764429.5.
(Continued)

*Primary Examiner* — Timothy X Pham
(74) *Attorney, Agent, or Firm* — Ramey & Schwaller LLP; Daniel J. Krueger

(57) ABSTRACT

A first method includes receiving a first reflected radar signal from a target in a first field of view and receiving a second reflected radar signal from a target in a second field of view offset from the first field of view by a predetermined distance; transforming the first and second reflected radar signals to obtain first and second sets of frequency coefficients, from which a frequency-dependent phase difference is obtained; and calculating a time-delay from the slope of the frequency dependence. A second method includes obtaining summed difference values between the first and second radar responses, where each of the summed difference values corresponds to different time shifts between the first and second radar response, and deriving from the summed difference values a time-delay associated with the target's motion from the first field of view to the second field of view. A third method combines the time-delays or associated speeds obtained from independent estimators.

6 Claims, 4 Drawing Sheets

(58) Field of Classification Search
USPC .......................................................... 342/59
See application file for complete search history.

(56) References Cited

U.S. PATENT DOCUMENTS

| | | | |
|---|---|---|---|
| 5,442,359 A | | 8/1995 | Rubin |
| 5,757,307 A | | 6/1998 | Nakatani et al. |
| 6,215,438 B1 | | 4/2001 | Oswald et al. |
| 6,339,395 B1 | | 1/2002 | Hazumi et al. |
| 6,462,702 B1 | * | 10/2002 | Bowlds ................. G01S 7/03 342/104 |
| 2004/0174294 A1 | | 9/2004 | Arnold et al. |
| 2005/0046597 A1 | | 3/2005 | Hutchison et al. |
| 2007/0008210 A1 | * | 1/2007 | Kibayashi .............. G01S 13/34 342/70 |
| 2011/0158361 A1 | * | 6/2011 | Dent ................... H04L 25/022 375/347 |
| 2015/0061922 A1 | * | 3/2015 | Kishigami ........... G01S 7/2813 342/147 |
| 2015/0247924 A1 | * | 9/2015 | Kishigami ........... G01S 13/931 342/70 |
| 2015/0369912 A1 | * | 12/2015 | Kishigami ............. G01S 13/26 342/113 |

OTHER PUBLICATIONS

PCT International Search Report and Written Opinion, dated Jun. 25, 2015, Appl No. PCT/US2015/021605, "Robust Dual-Radar-Beam Systems and Methods for Traffic Monitoring," filed Mar. 19, 2015, 15 pgs.

* cited by examiner

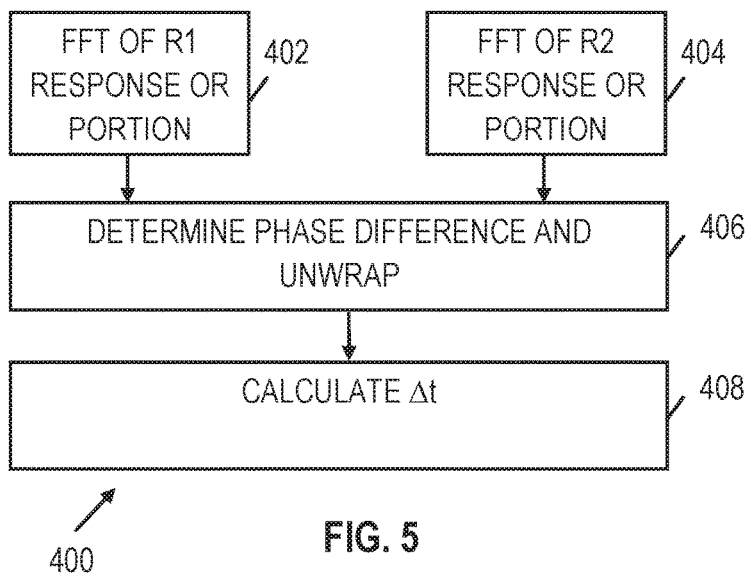
FIG. 5
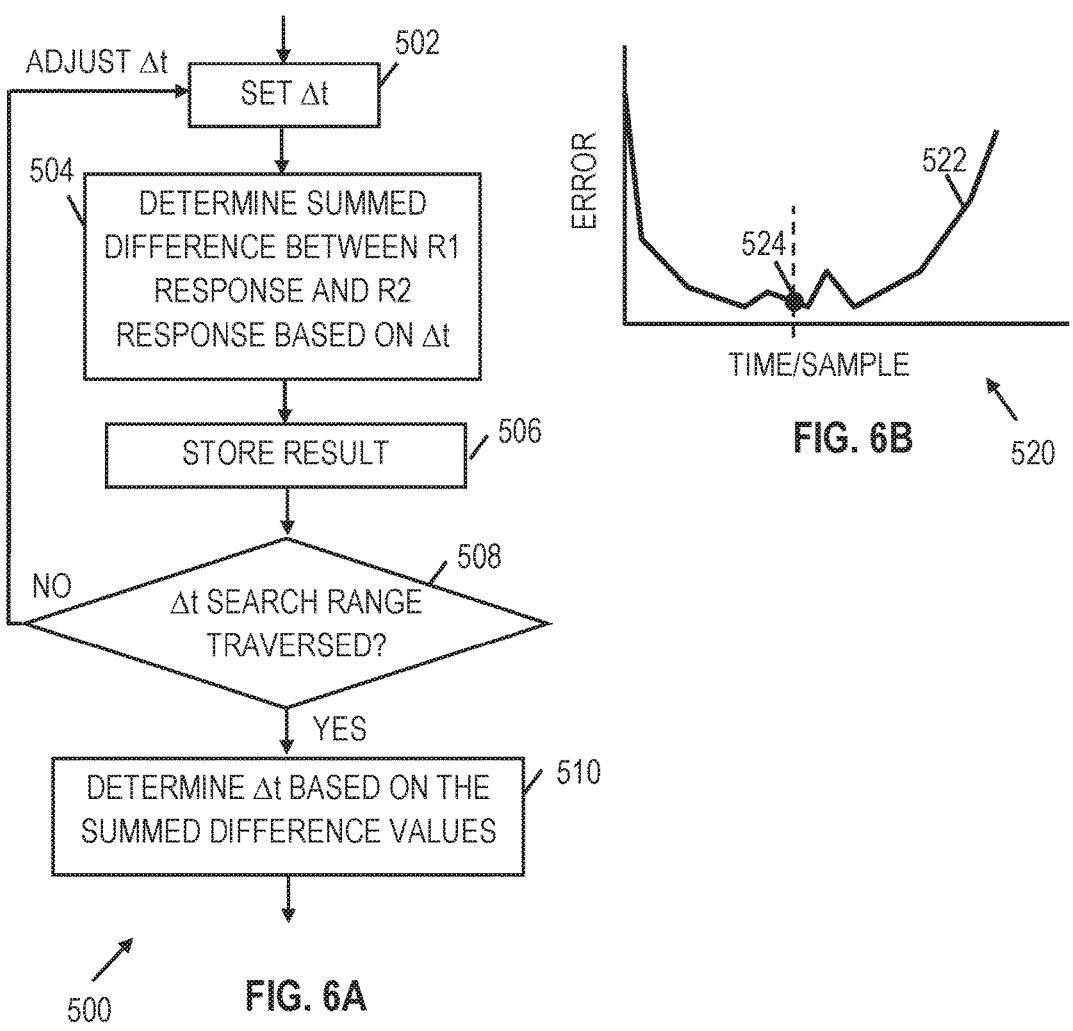
FIG. 6A
FIG. 6B

ROBUST DUAL-RADAR-BEAM SYSTEMS AND METHODS FOR TRAFFIC MONITORING

CROSS-REFERENCE TO RELATED APPLICATION

This application claims priority to Provisional U.S. Application Ser. No. 61/968,587, titled "Robust Dual-Radar-Beam Systems and Methods for Traffic Monitoring" and filed Mar. 21, 2014 by Sergei Sharanov, Brian Hill, Vipin Malik and Stanley J. Smith, which is incorporated herein by reference.

BACKGROUND

Various wired and wireless traffic monitoring techniques have been used to track the number and the speed of vehicles on a roadway. Among the more popular non-intrusive techniques in use is radar-based traffic monitoring. Yet radar-based traffic monitoring systems face a number of challenges including beam-spreading, multi-path interference, fading, electromagnetic interference, and generally high levels of attenuations. Consequently, many radar systems (even when frequently re-calibrated) routinely exhibit measurement errors exceeding 5%. For a significant fraction of the measurement attempts, many radar systems fail to register any measurement at all.

In repeated attempts to improve the reliability and accuracy of radar-based traffic monitoring, a number of system designs have been proposed. See, e.g., U.S. Pat. No. 7,426,450 "Systems and methods for monitoring speed", which discloses no less than nine radar-based speed monitoring techniques. Nevertheless, such techniques do not appear to adequately address the ever-increasing demands for improved accuracy and reliability.

BRIEF DESCRIPTION OF THE DRAWINGS

Accordingly, there are disclosed herein various dual-radar-beam systems and methods for traffic monitoring offering improved accuracy and reliability. In the drawings:

FIG. 5 is a flowchart of a first time-delay estimation method.

FIG. 6A is a flowchart of another time-delay estimator method.

FIG. 6B shows a plot that illustrates a summed difference values technique.

Figure 1:
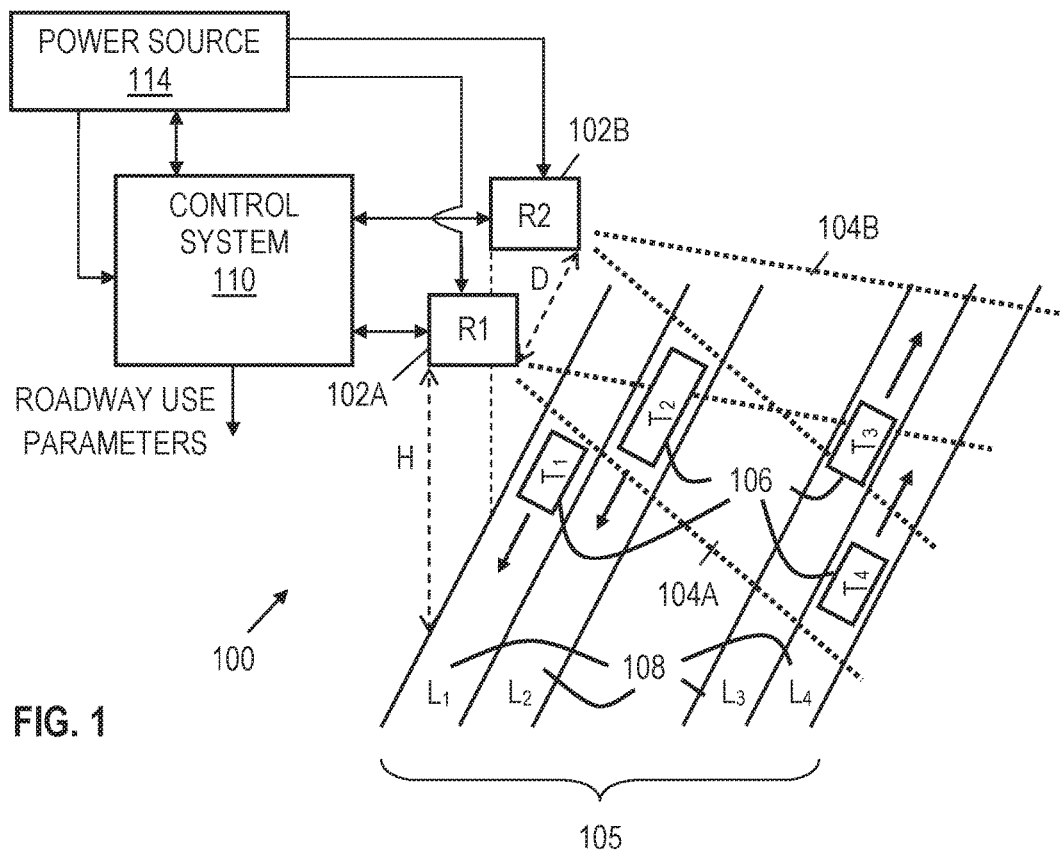
FIG. 1 shows an illustrative dual-radar-beam traffic monitoring environment.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed embodiments are directed to dual-radar-beam traffic monitoring systems and methods that apply one or more time-delay estimators or that apply different time-delay estimators together. FIG. 1 shows an illustrative dual-radar-beam traffic monitoring environment 100. In environment 100, radars 102A and 102B (labeled R1 and R2) are separated by a distance (D), and are positioned at a height (H) above roadway 105. The radars 102A and 102B are positioned to the side of roadway 105 are each mounted in a "side-fire" orientation, i.e., directed generally transverse to the roadway and generally parallel to each other. Each of the radars 102A and 102B has a different field of view of the roadway 105. More specifically, field of view 104A corresponds to radar 102A, while field of view 104B corresponds to radar 102B. Although the fields of view 104A and 104B are shown to partially overlap in environment 100, it should be understood that the fields of view 104A and 104B for radars 102A and 102B need not overlap. Further, the fields of view 104A and 104B represented in FIG. 1 assume the radars 102A and 102B are angle-aligned and have a similar range. It should be understood that the offset distance, angle alignment, and range of the radars 102A and 104B may vary intentionally or unintentionally, and that such variance can be accounted for to enable speed detection as described herein. Whether overlapping or not, a known offset distance between the fields of view 104A and 104B can be used to determine speed of a target once a time-delay between when the target traverses each of the fields of view 104A and 104B is determined. Further, as needed, a predetermined or estimated sampling delay or offset may added to the time-delay to determine the speed of a target.

To detect targets 106 (e.g., vehicles labeled $T_1$-$T_4$) traversing the roadway 105, the radars 102A and 102B transmit high-frequency electromagnetic waves (e.g., 20-40 GHz) and receive reflections from the targets 106. Accordingly, each radar 102A and 102B may include a transmitter (TX) and a receiver (RX). Alternatively, dual-radar-beams may be formed by having one transmitter illuminating the field of view of both receivers. In each case, there are at least two receivers having a field of view with a known separation from each other. The transmitter and receiver of radar 102A are coupled to one or more antennas and associated control circuitry. Likewise, the transmitter and receiver of radar 102B are coupled to one or more antennas and associated control circuitry. Such radars are commercially available as modules or as part of existing traffic monitoring systems.

As shown in environment 100, the targets 106 may be traveling in different lanes 108 (labeled $L_1$-$L_4$) and in opposite directions. The function of the radars 102A and 104B and the related control system 110 is to track roadway use parameters (e.g., the number of vehicles per lane, the length of vehicles, and the speed of vehicles) by obtaining and processing radar response signals (reflections) from targets 106 that pass through the fields of view 104A and 104B. Such roadway use parameters are stored and/or output from the control system 110 and may be accessed by traffic engineers or other interested parties. Further, the roadway use parameters may be processed to derive other parameters (e.g., lane occupancy) and/or may be displayed in different forms via suitable software applications. For example, such software may present speed, vehicle length, and/or number of the number of vehicles per lane (per time unit) on a display or computer monitor. The displayed data may be updated over time. Further, a display or computer monitor may present a roadway image or corresponding representation to show the movement of vehicles for one or more lanes.

The control system 110 may perform various operations. In at least some embodiments, the control system 110 manages the power level, timing, frequency, and other characteristics of electromagnetic waves emitted by radars 102A and 102B. Further, the control system 110 manages the digitization, buffering, and processing of radar response signals reflected from targets. In some embodiments, the control system 110 further determines roadway use parameters based in part on the results from one or more time-delay estimators as described further below. The control system 110 may store the determined roadway use parameters locally on nontransient information storage media such as optical, magnetic, or solid state disk, and/or may transmit the parameters via wired or wireless network to a remote server.

In environment 100, a power source 114 couples to the control system 110 and the radars 102A and 102B to provide power to perform the disclosed operations. In at least some embodiments, the power source 114 corresponds to a remote/limited power source such as a battery and/or a solar panel. In such case, the control system 110 may provide different power management options or modes to adjust power consumption as described herein.

Figure 2:
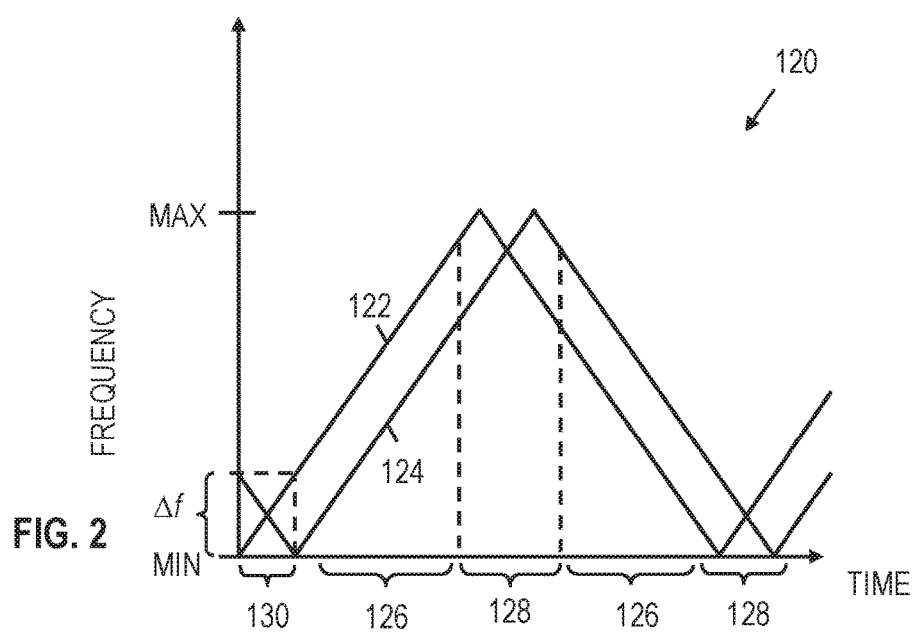
FIG. 2 shows an illustrative offset pattern for the use of two continuous wave frequency modulated (CWFM) radar signals.

As previously mentioned, the two radars may have overlapping fields of view. To prevent interference between the two radars, the system coordinates their operation. FIG. 2 is a chart 120 of an illustrative offset pattern for the coordinated use of two CWFM radar signals. In chart 120, line 122 shows the signal frequency transmitted by radar R1 as a function of time, while line 124 shows the signal frequency transmitted by radar R2 as a function of time. As shown, lines 122 and 124 extend between minimum and maximum frequencies following a triangular wave pattern. The minimum and maximum frequencies are preset based on various considerations including government regulations. As an example, the minimum frequency may be 24 GHz and the maximum frequency may be 24.25 GHz. As shown, a time interval 130 determines the time and frequency spacing between the lines 122 and 124. The time interval 130 may be selected such that the corresponding frequency spacing ($\Delta f$) enables each receiver to filter out unwanted signals (e.g., the receiver for radar R1 filters out the radar R2 response signal, and the receiver for radar R2 filters out the radar R1 response signal). However, the time interval 130 also subtracts from the useful measurement windows 126 where both radar response signals can be simultaneously received. The radar signals generally exhibit some nonlinearities near the slope reversals (the peaks and troughs of the triangular wave), and the intersections where the waves cross may cause the two radars to interfere with each other. If time interval 130 is kept sufficiently small, processing can be disabled in regions 128 without significantly impairing system performance.

Figure 3:
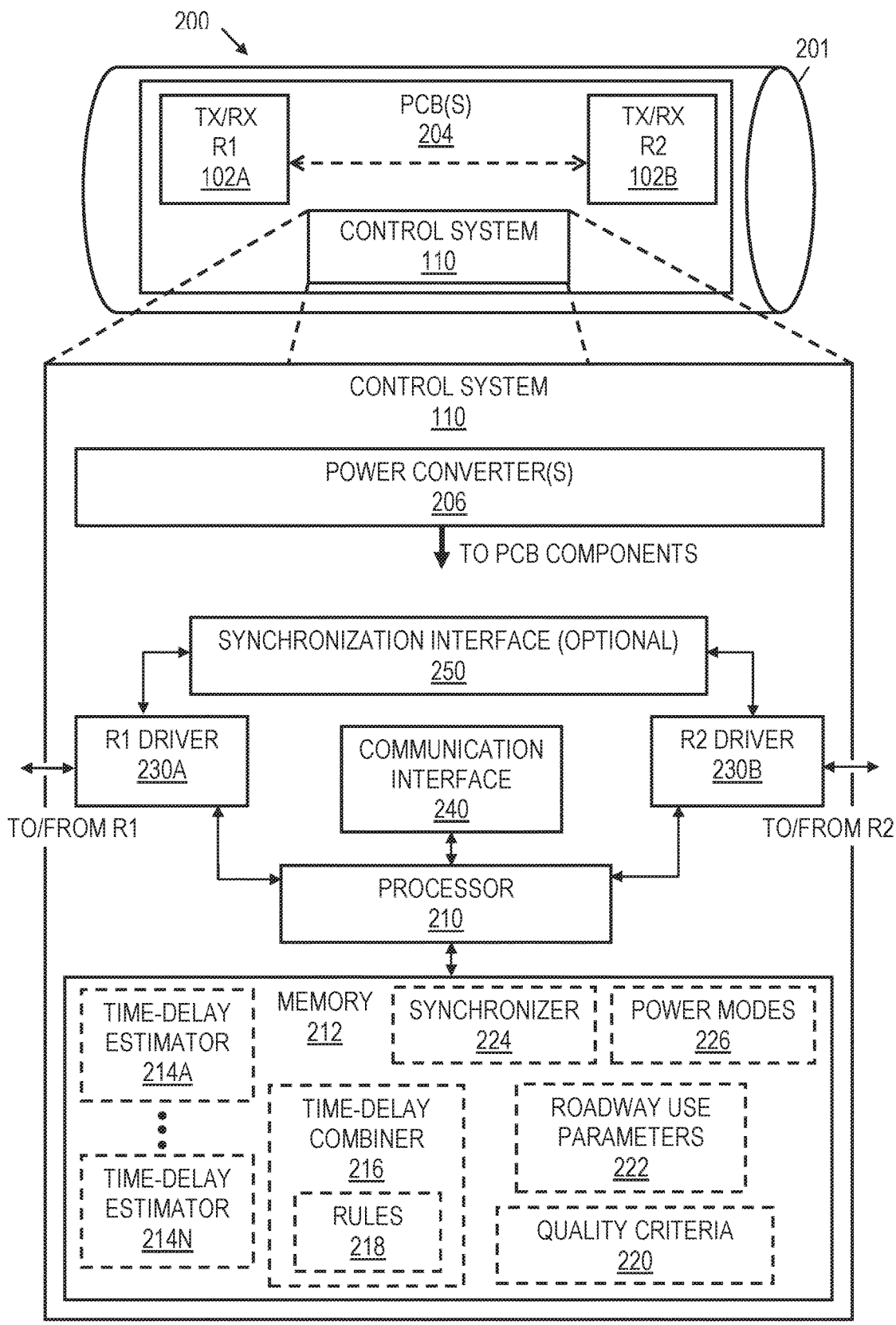
FIG. 3 shows an illustrative dual-radar-beam traffic monitoring device.

FIG. 3 shows an illustrative dual-radar-beam device 200 that includes radars 102A and 102B and control system 110 within a housing 201. The radars 102A and 102B may be separated by e.g., about 2 feet, to provide a known offset distance (D) between their respective fields of view. In some embodiments, the housing 201 may comprise a tube or other similarly shaped chassis that encloses and protects the inner electronics from moisture, and/or other contaminants. Further, the housing 201 may be made from a material that does not unduly interfere with the transmission and reception of electromagnetic waves. While the device 200 shows each of the radars 102A and 102B as having a transmitter (TX) and receiver (RX), it should be understood that other dual-radar-beam device embodiments may have fewer transmitters than receivers (e.g., a single transmitter and two receivers).

For device 200, the control system 110 includes one or more printed circuit boards (PCBs) 204 with conductive paths and with electronic components mounted thereto. In at least some embodiments, the electronic components include power converter(s) 206 that receive power from a power source (e.g., power source 114) and that provide controlled voltage and/or current levels for use by the various other components. The electronic components also include radar drivers 230A and 230B to direct operations of the radars 102A and 102B, and to process radar response signals and provide digitized events. The term "event" is used herein to refer to a set of measurements associated with a target's traversal of a radar's field of view. In at least some embodiments, the set of measurements includes three attributes, each measured as a function of time: range, speed, and magnitude. The range is the distance associated with the reflection, the speed is the time derivative of the range (optionally derived from Doppler shift of the radar signal), and magnitude is the absolute amplitude of the reflection. The radar drivers 230A, 230B may detect events when the reflection magnitude (or a filtered version thereof) exceeds a threshold.

Due to the separation between the radars' fields of view, each target causes each radar to detect an event at different times. The two events corresponding to a given target can be readily linked by the processor via any one of various techniques. For example, when the fields of view are substantially overlapping, the events too will overlap, making the linkage readily apparent. When less overlap exists, a range or lane-based event counting technique may be employed, restarting the counts during quiet periods and associating correspondingly numbered events thereafter.

As shown, the electronic components also include a processor 210 coupled to receive and link the event information from the radar drivers 230A, 230B, and further coupled to a memory 212 that stores the linked event information and software or firmware for analyzing the linked event information. The memory 212 may employ known volatile and/or non-volatile memory options for storing information, including magnetic and solid state drives. In at least some embodiments, the software stored by memory 212 includes one or more time-delay estimator modules 214A-214N. When applied to linked events, each of the time-delay estimator modules 214A-214N is able to determine a distinct time-delay estimate for the associated target's motion between the respective fields of view. In some embodiments, each time-delay estimator module 214 operates on the different attributes from the linked events to yield multiple time-delay estimates, e.g., a magnitude-based time-delay estimate, a range-based time-delay estimate, and a speed-based time-delay estimate. The software and/or firmware in memory 212 may further include a time-delay combiner module 216 that combines the results from the one or more of the time-delay estimator modules 214A-214N based on rules 218. Where only one time-delay estimator module is employed to yield a single time-delay estimate, the time-delay combiner module 216 may be omitted.

When the time-delay combiner module 216 is employed, the rules 218 for combining results may include static rules or dynamic adjustments applied to the results of each of the time-delay estimator modules 214A-214N. As an example, static rules for time-delay estimator modules 214A-214N may be established as part of the system and software development process that compares the performance of a number of candidate modules against measurements by a reference system. Once the measurement accuracy, random errors, and/or systematic errors of the various candidate modules has been assessed, a set of time-delay estimator modules 214A-214N providing substantially independent measurements is selected, with weights assigned according to the accuracy of each of the time-delay estimator modules 214A-214N. In some embodiments, the weighting to be applied to each of the time-delay estimator modules 214A-214N may be a function of the inverse of the variance between estimator results and the trusted measure.

Further, in at least some embodiments, the static rules established for each of the time-delay estimator modules 214A-214N may be adjusted dynamically during use, e.g., by adapting the associated weights based on the error variance. As another example, the control system 110 may discard one or more estimates if they deviate too far from the weighted average being updated in the system during operation or if such estimates fall outside a predetermined range around an average delay for that lane based on recent history while at least one estimate falls within that predetermined range. When discarding measurements, the weights for the remaining estimators may be re-normalized to account for the weights associated with the omitted estimator(s).

In at least some embodiments, validation thresholds or other quality criteria 220 are applied to individual estimator results or combined results. For example, the radar drivers 230A, 230B may track signal to noise ratio, tracking accuracy percentage, or some other measure of fading, noise levels, and/or interference, and may flag those targets that are detected during periods having low signal to noise ratio. The estimator modules can each measure a residual mismatch error once the estimated delay has been determined. Excessive noise or error levels can be taken as an indication that further validation is desired. A number of validation tests are contemplated. For example, the estimator results may be checked against: 1) results for adjacent vehicles in the lane; 2) an average lane value; 3) a range of typical vehicle lengths; 4) a lane direction; and/or 5) a speed threshold.

For the adjacent vehicle check, estimator results are compared with vehicles preceding and/or following a target in the same lane within a predetermined threshold time window. If the difference between adjacent vehicles within the time window is more than a threshold amount, the estimator results are determined to be invalid. For the average lane value check, estimator results or their derivative values are compared with an average time-delay or speed for a given lane. If the difference between average time-delay/lane speed and estimator results is more than a threshold amount, the estimator results are determined to be invalid. For the vehicle length check, a vehicle length distribution function determines a probability value for encountering different vehicle lengths. If any one of the event attributes indicate an unlikely vehicle length (e.g., less than 6 feet or greater than 80 feet), the associated estimator results are determined to be invalid. For the direction check, a determination is made regarding whether estimator results show a vehicle moving in direction opposite the lane flow. If so, the estimator results are determined to be invalid. For the speed threshold check, a determination is made regarding whether a vehicle speed is unreasonable (e.g., if speed is greater than 120 mph). If so, estimator results are determined to be invalid. Any results (e.g., time-delay, lane speed, direction, vehicle length) that are determined to be invalid may be omitted from the weighted combination, or replaced with a typical value, or the information associated with the linked events may be discarded. The roadway use parameters 222 may then be updated based on the results of the estimator module(s) 214 and (if present) the combiner 216.

The roadway use parameters 222 are stored for later access and may be responsively or periodically conveyed via communication interface 240 to a processing/storage entity external to the device 200. For example, the communication interface 240 may correspond to a wired or wireless interface that periodically transmits the roadway use parameters 222 to an external computer in response to a data delivery schedule or asynchronous request.

In at least some embodiments, the memory 212 also stores a synchronizer module 224. The synchronizer module 224 directs the timing of operations performed by the drivers 230A and 230B for radars 102A and 102B. In alternative embodiments, a synchronization interface 250 may be provided directly between drivers 230A and 230B. In such case, a delay between the operations of radars 102A and 102B is managed directly by the drivers 230A and 230B, rather than by the processor 210 and/or the synchronization module 224. The synchronization of radars 102A and 102B enable measurement windows 126 as described in chart 120 of FIG. 2.

In at least some embodiments, the memory 212 also stores a power modes module 226. The power modes module 226 provides control parameters (e.g., sample rate, radar power level, etc.) for different power modes. The different power modes may be triggered, for example, by a power/voltage level of a power source (e.g., power source 114), roadway use parameters (e.g., an amount of traffic, average speed determination), or a schedule (e.g., time of day/week, etc.). More specifically, if the amount of power remaining for power source 114 drops below a threshold level, a low-power mode may be initiated. In the low-power mode, both radars do not continually operate. Rather, one or both radars 102A and 102B may be directed to periodically transmit an electromagnetic wave until a target is detected. The timing of such transmissions may be selected to save power while ensuring targets are not missed. Once a target is detected, the sampling rate of one or both radars 102A and 102B is increased for a period of time to improve accuracy of the calculated roadway use parameters. If no targets are detected for a threshold amount of time, one or both radars 102A and 102B may return to a default low-power state. The low-power modes may adjust sample rates or other processes of device 200. In at least some embodiments, the device 200 is intended to have a power consumption of around 1 Watt, where the power consumption is adjustable using low-power modes such as those described herein.

Figure 4:
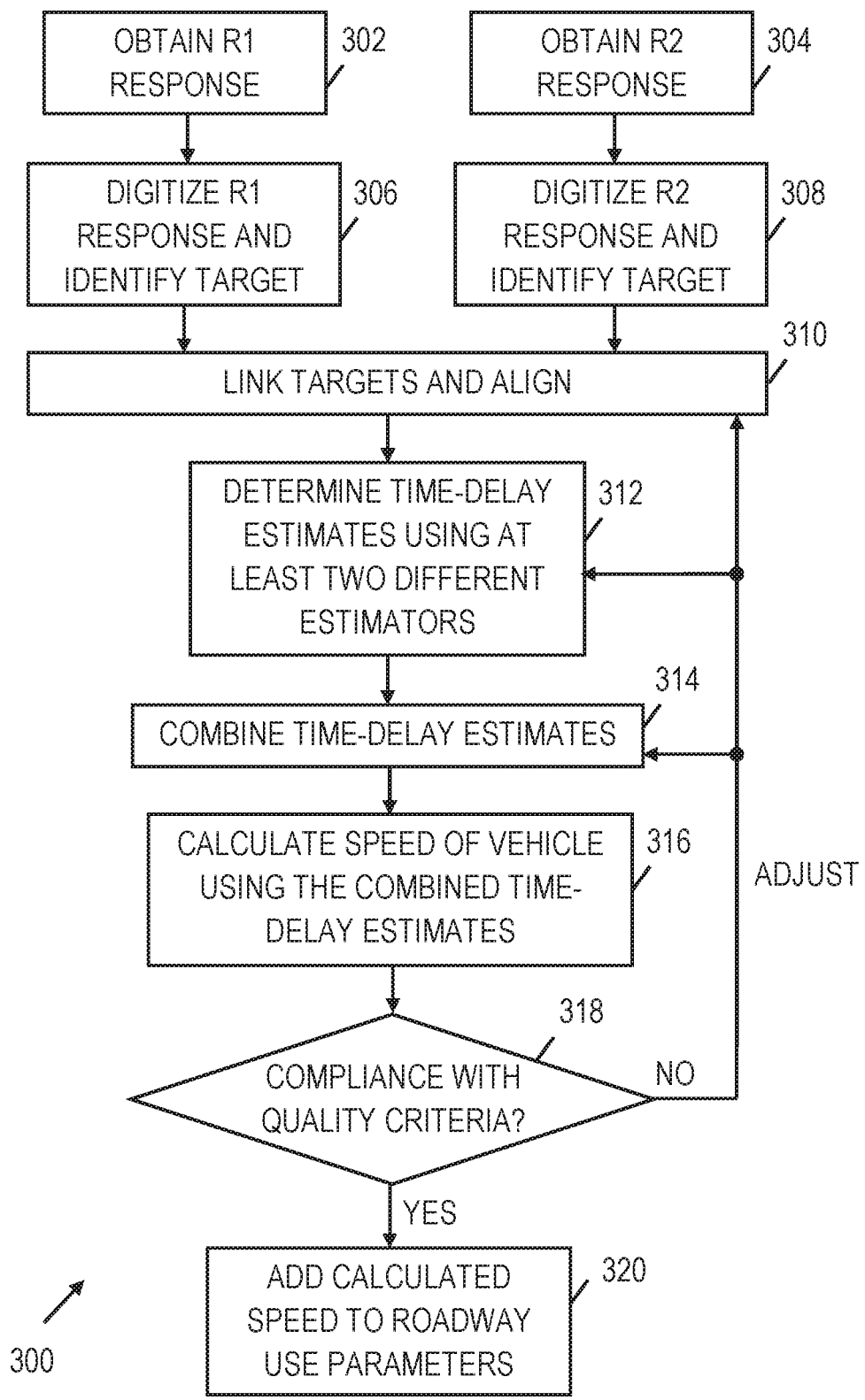
FIG. 4 is a flowchart of an illustrative dual-radar-beam traffic monitoring method.

FIG. 4 shows an illustrative flowchart of a first dual-radar-beam speed estimation method 300. At block 302, a response signal for radar 102A (referred to hereafter as the "R1 response signal") is obtained. Similarly, at block 304, a response signal for radar 102B (referred to hereafter as the "R2 response signal") is obtained. At blocks 306 and 308, the R1 and R2 response signals are digitized and processed to detect targets and capture event information. Depending on the roadway, it may be possible for multiple targets to be simultaneously present in the field of view, in which case multiple events are captured concurrently. The range attribute may be used to distinguish different targets and associate events with corresponding roadway lanes.

At block 310, the processor links the associated R1 and R2 radar events for each target. The processor may further identify a sample time offset that (at least roughly) aligns the linked events with each other and may trim or zero-pad the linked events as needed to enforce a predetermined window length (e.g., 512 samples). This alignment step is expected to leave some residual alignment (time-delay) error. One illustrative alignment strategy causes each windowed event to begin with the first sample having a magnitude that exceeds a detection threshold. A related alignment strategy would be to have each windowed event end with a first sample having a magnitude that falls below a detection threshold. Yet another alignment strategy would be to identify the middle of each event by averaging the sample time that first exceeds the threshold and the sample time that first falls below the threshold, and to align the middles by symmetrically trimming or padding the events to reach the window length. In some embodiments, the different sample times of whichever alignment points are used (a beginning point, an end point, or a middle point) are subtracted to determine an alignment offset that can be used for later reference.

At block 312, multiple time-delay estimates between linked events are determined, preferably using at least two different estimators. At block 314, the time-delay estimates determined in block 312 are combined. For example, the rules for combining the different time-delay estimates may include averaging and/or weighting the time-delay estimates as described previously. At block 316, the speed of a vehicle associated with the linked events is calculated. For example, the speed of a vehicle may be calculated using a time-delay estimate provided by block 314, a known offset distance between receiver fields of view, and a predetermined or estimated sampling delay or offset for the receivers involved.

If the calculated speed complies with quality criteria (decision block 318), the calculated speed is added along with other event information to the roadway use parameters at block 320. Otherwise, the method returns to block 310. The operations of blocks 310, 312, 314, 316, and 318 can be repeated as needed with adjustments made to one or more of blocks 310, 312, and 314, until the calculated speed complies with quality criteria (determination block 318). Alternatively, typical or representative values may be substituted for invalid results (e.g., an average value or adjacent vehicle value) or the invalid results may be discarded.

There are many different ways to estimate the time-delay between linked events in the R1 and R2 responses. Generally, determining a time-delay estimate is not a trivial task due to the amount of noise in the R1 and R2 responses. Such noise can affect proper target identification (size, position/lane) and the speed calculation. Possible techniques for determining a time-delay include applying a correlation function, measuring a time-delay between radar responses directly, and using the frequency difference obtained by multiplying radar responses together. See e.g., U.S. Pat. No. 7,426,450. In addition, FIGS. 5 and 6A show illustrative flowcharts of other time-delay estimator methods.

In FIG. 5, the time-delay estimator method 400 (referred to herein as a "phase difference" method) performs a Fourier Transform (e.g., a Fast or Discrete Fourier Transform) of the windowed R1 event attribute (block 402) and the windowed R2 event attribute (block 404). (In the following discussion, it is assumed that the attribute is absolute magnitude, but the described method is also applicable for other attributes such as range and speed.) At block 406, the phase difference between corresponding harmonics of the frequency-transformed events is determined, the phase difference being proportional to the residual time-delay and harmonic number. In other words, the slope or angle of the phase difference as a function of harmonic number can be used to determine a time-delay estimate, so long as phase wrap-arounds are properly accounted for. (Angular measurements are subject to an inherent ambiguity due to the equivalence of angles that are separated by integer multiples of 360° (2 πradians), which is often expressed as a modulo 2 πoperation.) Various suitable phase unwrapping methods are known, any one of which may be employed in block 406 as part of determining the linear slope of the phase dependence. For example, the phase unwrapping operations may involve searching through a range of feasible slope values to find one that produces a minimum of the weighted sum of the squares of the phase differences for all harmonics. In at least some embodiments, the operations of block 406 may be represented as:

$$E(K)=\Sigma_i W_i[fmod(Phase(H1_i)-Phase(H2_i)-iK,Pi)]^2, \quad \text{Equation (1)}$$

where $H1_i$ and $H2_i$ are the frequency coefficients for linked R1 and R2 event attributes, i is the harmonic index, fmod( )is modular division and $W_i$ is a suitable weight (e.g., the harmonic power $|H1_i||H2_i|$). For Equation 1, the value of K that results in the minimum value for E(K) corresponds to the slope of interest. At block 408, the time-delay (Δt) is determined using the slope found in block 406. The method may be repeated for the other event attributes to obtain corresponding time-delay estimates. These estimates of the residual time-delay may be combined with the alignment offset (and any other clock offsets being tracked) to obtain a full estimate of the time-delay between linked events.

In FIG. 6A, another time-delay estimator method 500 is described. The method 500 iterates through a range of feasible time-delays, starting with an initial estimated time-delay (Δt) at block 502. At block 504, the summed difference between the windowed event attribute for radars R1 and R2 is determined based on the time-delay set at block 502. The result is stored at block 506 as a corresponding element of a summed difference array. If a Δt search range has been traversed (decision block 508), the value of Δt is determined based on the values of the summed difference array at block 510. Otherwise, the value of Δt is adjusted and the method 500 returns to block 502. The operations of blocks 502, 504, 506, and 508 can be repeated as needed, until the Δt search range has been traversed. In at least some embodiments, the operations of block 504 include the following summed difference value e(k) calculations:

$$e(k) = \frac{1}{N-k}\sum_{i=1}^{N-k} |f1_{i+k} - f2_i| \text{ for } k \geq 0, \text{ and} \quad \text{Equation (2)}$$

$$e(k) = \frac{1}{N+k}\sum_{i=1}^{N+k} |f1_i - f2_{i-k}| \text{ for } k < 0, \quad \text{Equation (3)}$$

where N is a sample number, k is a sample offset corresponding to time-delay estimate (Δt/T), $f1_i$ and $f2_i$ are linked event attribute values for R1 and R2. The calculations of Equations 2 and 3 may be repeated for multiple shifts within a predetermined range (e.g., k=−50 to k=50) to obtain an array of average absolute error versus time shift. See, e.g., FIG. 6B and the accompanying discussion below. Further, in at least some embodiments, the operations of block 510 may include determining the centroid of the summed difference values, where the centroid is calculated as:

$$\bar{k} = \frac{\sum_k k\{e(k)-M\}}{\sum_k \{e(k)-M\}}. \quad \text{Equation (4)}$$

where M is a maximum or predetermined value that is typically larger than most values of the array. The centroid corresponds to an estimate of the residual time-delay between the windowed events. In at least some embodiments, the centroid calculation is performed iteratively without precomputing and storing all summed difference values. Instead, running sums are stored and divided one by the other at the end. Further, in some embodiments, curve fitting or interpolation may be employed to find the residual time-delay between the events. In any event, the residual time-delay is added to the alignment offset to obtain a full estimate of the time-delay between events. The process may be repeated for other event attributes to yield multiple time-delay estimates.

The process of method 500 can be described as a minimum error search that is performed by subtracting windowed attributes of the linked events. Data from one of the radars is shifted for each iteration of the minimum error search. This minimum error search can estimate the time-delay to an accuracy level of approximately one sample period. A more refined result (attempting sub-sample accuracy) is subsequently found by determining the centroid in the array generated by the minimum error search.

FIG. 6B shows a plot 520 related to method 500. In plot 520, the amount of error (the summed difference between the R1 and R2 event attributes) is plotted as a function of time shift or sample shift. The purpose of method 500 is to determine the time shift or sample shift that corresponds to a point of minimum error 524. This point of minimum error 524 can be determined in different ways and is not necessarily a trivial operation as the amount of noise may result in an error curve 522 with multiple minimums. Without limitation, the point of minimum error 524 may be determined using a centroid calculation as described herein. The time-delay estimation method 500 may be implemented alone or may be combined with at least one other time-delay estimation technique as described herein.

In at least some embodiments, a vehicle's speed is determined by three sets of inputs: the results of time-delay estimator method 400, the results of time-delay estimator method 500, and recent road history. Further, a known offset distance between receiver fields of view, and a predetermined or estimated sampling delay or offset between receivers is used to determine a vehicles' speed. For each of the methods 400 and 500, a quality assessment value is determined for the results as described previously. One way in which this quality assessment value may be determined, for example, is as a function of the success of each radar in tracking an individual target. As a specific example, the quality assessment value may be function of a tracking accuracy percentage that indicates the percentage of time during the span of a given event that tracking was "successful", i.e., the span during which the reflected signal magnitude was above a detection threshold. The quality assessment may also be a function of a least-squared error search performed for methods 400 and 500. In some embodiments, the quality assessment value is also a function of the total energy of the event. For example, event energy may be determined as the sum of the squares of the time series of magnitudes for the event.

In at least some embodiments, the quality assessment value is determined as:

$$\text{Quality} = Km \frac{\text{tracking success \%}}{\text{least squared error result/event energy}}. \quad \text{Equation (5)}$$

If the quality assessment value of the results of methods 400 and 500 exceeds a minimum threshold, an initial estimate of vehicle speed may in some embodiments be produced by averaging the results from methods 400 and 500. For example, a simple numerical mean may be used, or a weighted average should the results of one method be found generally more accurate than the other in a given circumstance. Alternatively, the results of method 400 or 500 with the highest quality assessment value is chosen if one result is below a threshold. The filtered and/or combined results of method 400 or 500 is referred to as a "combined result."

After the combined result is determined, a special handling assessment may be performed. For example, special handling may be applied if: 1) the results of methods 400 and 500 differ by more than a predetermined amount; 2) the methods 400 and 500 did not agree on direction of travel; 3) the combined result differs from the lane average speed more than a predetermined amount; and the quality assessment value of one of the methods 400 or 500 was below a threshold (e.g., a speed is deemed to be unreasonably high or low). When a vehicle has been selected for special handling, the results from the two methods 400 and 500 are compared to the last vehicle in the same lane. If the previous vehicle was recent, and one of the results from the two methods 400 and 500 is near that vehicle speed, then the result from that method is chosen as the final speed result. If no immediately preceding vehicle is available for comparison, the average lane speed is used for comparison. The result from the method 400 or 500 that is nearest to the average lane speed is used (within a speed window). If neither of the results of methods 400 or 500 is close to the average lane speed, the speed of this vehicle is recomputed with a narrower search window around the average lane speed, and with an assigned direction of travel for this lane (e.g., an observed majority of the last several cars).

Embodiments disclosed herein include:

A: A traffic monitoring method that comprises receiving a first reflected radar signal from a target traversing a first field of view; receiving a second reflected radar signal from the target as it traverses a second field of view offset from the first field of view by a predetermined distance; transforming the first and second reflected radar signals to obtain first and second sets of frequency coefficients; obtaining a phase difference between the first and second sets of frequency coefficients; determining a slope representing a dependence of the phase difference on frequency; calculating a time-delay from the slope; and combining the time-delay with the predetermined distance to determine a speed of the target.

B: A traffic monitoring method that comprises receiving a first reflected radar signal from a target traversing a first field of view; receiving a second reflected radar signal from the target as it traverses a second field of view offset from the first field of view by a predetermined distance; using the first and second reflected radar signals to obtain summed difference values, wherein each of the summed difference values corresponds to different time shifts between the first and second reflected radar signals; determining a time-delay based on the summed difference values; and combining the time-delay with the predetermined distance to determine a speed of the target.

C: A traffic monitoring system that comprises a first radar that receives reflected radar signals from targets traversing a first field of view; a second radar that receives reflected radar signals from targets traversing a second field of view, each traversal of the first and second fields of view producing linked events each having at least one time dependent event attribute; a nontransient information storage medium that stores roadway use parameters including vehicle speed; and a controller in communication with the first and second radars to derive vehicle speeds from the linked events and to responsively update the roadway use parameters. As part of deriving the vehicle speeds, the controller determines a time-delay between the linked events by combining results from at least two different types of time-delay estimators. The controller calculates a speed of the linked event based on the determined time-delay and a distance between the first and second fields of view.

Each of the embodiments, A, B, and C, may have one or more of the following additional elements in any combination. Element 1: receiving first and second reflected radar signals includes: tracking a set of first event attributes as a function of time as the target traverses the first field of view, and tracking a set of second event attributes as a function of time as the target traverses the second field of view; and wherein transforming the first and second reflected radar signals comprises: trimming or padding at least one attribute from each of the first and second events to a predetermined window length, and applying a discrete Fourier transform to the at least one attribute from each of the first and second events. Element 2: transforming the first and second reflected radar signals comprises: trimming or padding each of multiple attributes from each of the first and second events to a predetermined window length, and applying a discrete Fourier transform to each of the multiple attributes from each of the first and second events; and wherein said obtaining, determining, and calculating are repeated to determine a time-delay from each of the multiple attributes, and wherein said combining the time-delay with the predetermined distance comprises combining a weighted average of the time-delays with the predetermined distance to determine the speed of the target. Element 3: determining the slope comprises performing phase unwrapping on the phase difference. Element 4: further comprising performing a line slope search using the phase difference, and selecting a line slope yielding a minimum mean square error. Element 5: determining a time-delay comprises calculating an error as:

$$E(K) = \Sigma_i W_i [f\mathrm{mod}(\mathrm{Phase}(H1_i) - \mathrm{Phase}(H2_i) - iK, Pi)]^2$$

where $H1_i$ and $H2_i$ are the frequency coefficients from the first and second sets, i is the harmonic index, K is a slope, and $W_i$ is a weight. Element 6: further comprising using the speed to update a set of roadway use parameters stored on a nontransient information storage medium.

Element 7: further comprising using the speed to update a set of roadway use parameters stored on a nontransient information storage medium. Element 8: receiving first and second reflected radar signals includes: tracking a set of first event attributes as a function of time as the target traverses the first field of view, and tracking a set of second event attributes as a function of time as the target traverses the second field of view; and wherein said using comprises: trimming or padding at least one attribute from each of the first and second events to a predetermined window length, offsetting windowed attribute values for the first and second events by the time shift for a given entry, differencing the offset windowed attribute values, and summing absolute values of the differences between the offset windowed attribute values for the at least one attribute from each of the first and second events. Element 9: using the first and second reflected radar signals to obtain summed difference values comprises: trimming or padding each of multiple attributes from each of the first and second events to a predetermined window length; wherein said offsetting, differencing, summing, and determining steps are repeated to determine a time-delay from each of the multiple attributes; and wherein said combining comprises combining a weighted average of the time-delays with the predetermined distance to determine the speed of the target. Element 10: wherein the summed difference values are each representable as:

$$e(k) = \frac{1}{N-k} \sum_{i=1}^{N-k} |f1_{i+k} - f2_i| \text{ for } K \geq 0, \text{ and}$$

$$e(k) = \frac{1}{N+k} \sum_{i=1}^{N+k} |f1_i - f2_{i-k}| \text{ for } K < 0,$$

where N is a sample number, k is a sample offset, and $f1_i$ and $f2_i$ are values from the at least one attribute for the first and second events. Element 11: determining a time-delay based on the summed difference values comprises fitting a curve to the summed difference values. Element 12: determining a time-delay comprises determining a centroid of the summed difference values.

Element 13: wherein the at least two different types of time-delay estimators include: a phase difference slope method and a summed difference values method. Element 14: wherein the linked events have multiple time dependent event attributes, and wherein each of the at least two different types of time-delay estimators are applied to each of the multiple time dependent event attributes to obtain a corresponding plurality of time-delay estimates that are combined to yield the determined time-delay between the linked events. Element 15: further comprising a battery or solar panel to power electrical components of the system. Element 16: the controller operates the first and second radars in a plurality of power modes, and wherein the controller switches between the plurality of power modes in response to one or more events. Element 17: further comprising a one or more printed circuit boards mounted within a single housing that encloses the first and second radars, wherein the printed circuit boards maintain the first and second radars in a fixed relative position and orientation.

Numerous other variations and modifications will become apparent to those skilled in the art once the above disclosure is fully appreciated. It is intended that the following claims be interpreted to embrace all such variations and modifications where applicable.

What is claimed is:
1. A traffic monitoring method, comprising:
receiving a first reflected radar signal from a target and tracking a first event attribute as a function of time as the target traverses a first field of view;
receiving a second reflected radar signal from the target and tracking a second event attribute as a function of time as the target traverses a second field of view offset from the first field of view by a predetermined distance;
transforming the first and second event attributes to obtain first and second sets of frequency coefficients, said transforming including:
trimming or padding the first and second attributes to a predetermined window length; and
applying a Fourier transform to each of the first and second event attributes;
obtaining a phase difference between the first and second sets of frequency coefficients;
determining a slope representing a dependence of the phase difference on frequency by minimizing a mean square error between the phase difference and a line having said slope, the mean square error accounting for phase wrap-arounds;

calculating a time-delay from the slope; and determining a speed of the target based on the calculated time-delay and the predetermined distance.

2. The method of claim 1, wherein determining a speed of the target further comprises combining the calculated time-delay with a receiver sampling delay.

3. The method of claim 1, wherein said receiving first and second reflected radar signals includes:

tracking a set of first event attributes as a function of time as the target traverses the first field of view; and tracking a set of second event attributes as a function of time as the target traverses the second field of view, wherein the set of first event attributes and the second set of event attributes each include range, speed, and magnitude.

4. The method of claim 3, wherein said transforming comprises:

trimming or padding each of multiple attributes from each of the first and second events to a predetermined window length; and applying a Fourier transform to each of the multiple attributes from each of the first and second events, wherein said obtaining, determining, and calculating are repeated to determine a time-delay from each of the multiple attributes, and wherein said method further comprises combining a weighted average of the time-delays with the predetermined distance to determine the speed of the target.

5. A traffic monitoring method, comprising:

receiving a first reflected radar signal from a target and tracking a first event attribute as a function of time as the target traverses a first field of view;

receiving a second reflected radar signal from the target and tracking a second event attribute as a function of time as the target traverses a second field of view offset from the first field of view by a predetermined distance;

transforming the first and second event attributes to obtain first and second sets of frequency coefficients;

obtaining a phase difference between the first and second sets of frequency coefficients;

determining a slope representing a dependence of the phase difference on frequency by calculating an error as:

$$E(K)=\Sigma_i W_i[fmod(Phase(H1_i)-Phase(H2_i)-iK,Pi)]^2,$$

where $H1_i$ and $H2_i$ are the frequency coefficients from the first and second sets, i is the harmonic index, K is a slope, and $W_i$ is a weight, calculating a time-delay from the slope; and determining a speed of the target based on the calculated time-delay and the predetermined distance.

6. The method of claim 1, further comprising using the speed to update a set of roadway use parameters stored on a nontransient information storage medium.

* * * * *